United States Patent [19]

Hester et al.

[11] Patent Number: 4,680,700
[45] Date of Patent: Jul. 14, 1987

[54] VIRTUAL MEMORY ADDRESS TRANSLATION MECHANISM WITH COMBINED HASH ADDRESS TABLE AND INVERTED PAGE TABLE

[75] Inventors: Phillip D. Hester; Richard O. Simpson, both of Austin, Tex.

[73] Assignee: International Business Machines Corporation, Armonk, N.Y.

[21] Appl. No.: 945,228

[22] Filed: Dec. 19, 1986

Related U.S. Application Data

[63] Continuation of Ser. No. 558,244, Dec. 7, 1983, abandoned.

[51] Int. Cl.⁴ .......................... G06F 13/00; G06F 9/36
[52] U.S. Cl. ..................................................... 364/200
[58] Field of Search .............................. 364/200, 900

[56] References Cited

U.S. PATENT DOCUMENTS

| | | |
|---|---|---|
| 3,761,881 | 9/1973 | Anderson et al. ................... 364/200 |
| 3,781,808 | 12/1973 | Ahearn et al. ....................... 364/200 |
| 4,215,402 | 7/1980 | Mitchell et al. ..................... 364/200 |
| 4,285,040 | 8/1981 | Carlson et al. ...................... 364/200 |
| 4,356,549 | 10/1982 | Chueh ................................. 364/200 |
| 4,464,713 | 8/1984 | Benhase et al. ..................... 364/200 |

FOREIGN PATENT DOCUMENTS 0007003 11/1979 United Kingdom .

OTHER PUBLICATIONS

IBM Technical Disclosure Bulletin, vol. 24, No. 6, 11/81, "Virtual to Real Address Translation Using Hashing", by J. Cocke et al.
8th Annual Symposium on Computer Architecture entitled, "IBM System/38 Support for Capability—Based Addressing", by Merle E. Houdek et al., 5/81.

Primary Examiner—Gareth D. Shaw
Assistant Examiner—Randy W. Lacasse
Attorney, Agent, or Firm—J. B. Kraft; Thomas E. Tyson

[57] ABSTRACT

A virtual memory address translation mechanism is provided for converting virtual memory addresses provided by a CPU into real memory addresses within page frames in a large hierachial memory wherein the real memory space is substantially smaller than the scope of the virtual memory. The conversion or translation mechanism includes a combined table in the memory which includes a first list covering the respective virtual address of each memory address (Inverted Page Table or IPT) and a second list connecting each of a plurality of hashed addresses with a predetermined initial virtual address of a linked group of virtual addresses, each of which when hashed produces the connected hashed address (Hashed Addressed Table, HAT). The system also has means for hashing a selected virtual address to produce a hashed address. Also included is apparatus for sequentially searching through the linked group of virtual addresses in the combined table until a selected virtual address is located as well as apparatus responsive to the location of a particular selected virtual address for accessing from the first list, the real memory address of the located virtual address.

14 Claims, 21 Drawing Figures

SEGMENT REGISTERS

TRANSLATION LOOKASIDE BUFFERS

HASH ANCHOR TABLE / INVERTED PAGE TABLE

TLB FORMAT
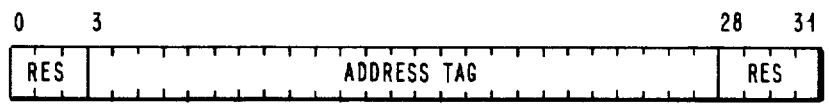
FIG. 18.1
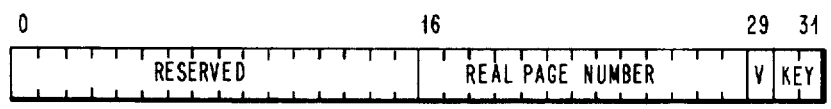
FIG. 18.2
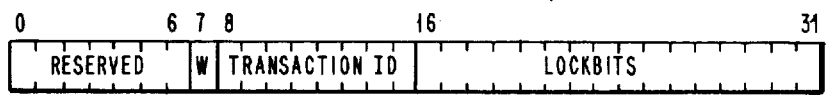
FIG. 18.3

VIRTUAL MEMORY ADDRESS TRANSLATION MECHANISM WITH COMBINED HASH ADDRESS TABLE AND INVERTED PAGE TABLE

This is a continuation of application Ser. No. 558,244 filed Dec. 7, 1983 now abandoned.

RELATED APPLICATION

This application is related to the following application assigned to a common assignee: Ser. No. PCT/US82/01829, Filed Dec. 30, 1982, A. Chang, J. Cocke, M. F. Mergen, G. Radin, "Virtual Memory Address Translation Mechanism with Controlled Data Persistence".

This related patent application covers the use of an Inverted Page Table (IPT) in the translation of virtual memory addresses to real memory addresses. The disclosure of the related patent application involves a translation mechanism including a special set of translation tables referred to as the Translation Look Aside buffers which contain current real address translations of frequently used virtual addresses. These Translation Look Aside buffers are first addressed to determine whether the virtual address is included in the buffer. If it is, then an immediate translation from the virtual address to the real address is present. However, if the virtual address is not present in the buffer, then, the page frame tables stored in the main memory are accessed and searched for the desired virtual address, and if the virtual address is found, its associated real address is accessed.

The present patent application covers a combined table which may be used in the system of the copending application to search for the real addresses of given virtual addresses. The table of the present invention combines a Hash Address Table (HAT) with an Inverted Page Table (IPT) used to obtain the real addresses from stored virtual addresses. The present invention is described in great detail in said copending application but not claimed therein. Accordingly, and for the sake of completeness, both the description of the preferred embodiment as well as the drawing of said copending application are being included in the present application.

TECHNICAL FIELD

The present invention relates generally to computer memory subsystems and more particularly to such a memory subsystem organized into what is known in the art as a virtual memory. Still more particularly, the invention relates to an apparatus for converting virtual addresses into real memory addresses and for effecting certain unique control functions within the memory hierarchy.

BACKGROUND ART

In most modern computer systems, when a program is executing, it frequently attempts to access data or code which resides somewhere in the system (that is, in some level of the cache/main store/Direct Access Storage Device (DASD) storage hierarchy or even at another node in a distributed system network). For the most primitive system, consider what the program must understand in order to make this access.

Where is the data (or code)? The location will generally determine what kind of address must be used for the access (e.g. main storage address of 24 bits, or sector address on a disk track, or node address in a network). The location will also determine what kinds of instructions must be used to accomplish the access (e.g. Load/Store/Branch for main storage accesses, channel command words for disk accesses, communication protocols for network accesses).

Is this data shared with other program executions? If it is, the access cannot proceed unless certain locks are held. If the changes which this program is about to make to data are not to be seen by others at this time, the Store instruction must be to some private address.

Is this data to be recoverable? If it is, some "journalling" strategy must be implemented so that a consistent prior state of the data can be retrieved when necessary.

Suppose, in this very primitive system, the program was in fact required to make these distinctions at each access. Then the following would result:

If the program is to be generally applicable the accesses would be very slow, even for the most frequent occurrences of "trivial, safe" requests, namely, for private, unrecoverable data in main storage.

If the program were to perform well it would be locked into one accessing mode, so that it would not run correctly against data with different characteristics.

The program would be complex, large and prone to error.

Modern systems have addressed these problems in varying degrees. For instance:

Relocate architectures generally allow private, unrecoverable, nonpersistent data and programs to be addressed uniformly, with an address size of 16 to 32 bits —(usually adequate for temporary computational requirements). When these architectures are implemented with proper "look-aside" hardware, the vast majority of such accesses are accomplished at cache or main storage speeds. Only when this look-aside hardware fails (less than one in one hundred attempts) does the system pay the cost of accessing the relocation table structure. And only when the relocation tables fail (i.e. the data is not in main storage) does the system pay the significant "page fault" overhead. Thus the penalties are paid only when they are really necessary, which is surely the goal of a good architecture and implementation.

When the data is to persist beyond this execution of this program, most modern systems require that, instead of Load/Store/Branch instructions, access be made by explicit requests to software-implemented "access methods." These access methods generally support data which are organized into certain defined aggregates, called "records" and "files." The "instructions" to access are usually called "read/write" or "get/put."

This data is not shared or recoverable. It may in fact be in main storage (in some buffer area). But for every access, the program must pay the overhead of these explicit "read/write" calls. Thus access methods, when suitably defined have resulted in programs which are less complex and more generally usable than in primitive systems, but the performance of these accesses are uniformly poorer than Load/Store, and the data accessed must have been structured into the appropriate aggregate type.

When the data is to be shared or recovered, most modern systems require that explicit requests be made to softwareimplemented "data-base subsystems." These accesses are generally much slower than those for access methods, not only because of the additional functions of lock and journal management, but also because the kinds of aggregates which these subsystems support (e.g. relations, hierarchies) are themselves more complex.

Again, the data may in fact be more simply structured and in a buffer in main storage, but the overhead must be paid on every access request.

Some systems support the recovery of non-persistent data with a facility called "checkpointing." Now the programmer who wishes to write a recoverable application must deal with three different facilities—checkpointing for computational data, explicit backup for files, and "commit" instructions for data base.

The IBM System/38 has gone farther than most systems in providing at least a uniform addressing structure for all data. But it has done this at the cost of making all addresses very large, many accesses very slow, much storage and hardware required to implement the architecture, and has not yet provided a uniform approach to sharing or recovery.

Various techniques are known in the art whereby a number of computer programs, whether executed by a single essential processing unit or by a plurality of such a processing units, share a single memory. The memory being shared by programs in this manner requires an extremely large parent storage capacity, which capacity is often much larger than the actual capacity of the memory. If, for example, a system employs a 32-bit addressing scheme, $2^{32}$ addressable bytes of virtual storage are available. This virtual storage space is conventionally thought of as being divided into a predetermined number of areas or segments each of which is in turn divided into pages with each page consisting of a predetermined number of lines each in turn having a predetermined number of bytes. Thus segment and page designations or addresses assigned to virtual storage are arbitrary programming designations and are not actual locations in main storage. Therefore, virtual segments and pages are usually randomly located throughout main storage and swap in and out of main storage from backing store as they are needed.

The random location of segments and pages in main storage necessitates the translation of virtual addresses to actual or real addresses using a set of address translation tables that are located in main storage conventionally referred to as page frame tables. In a large virtual system a great many such address translation tables are employed. These may be organized in a number of different ways. The essential feature of any such organization is that the particular virtual address must logically map to a memory location in said tables which will contain the real address for said virtual address (if one exists).

Functionally, the operation of such address conversion tables is as follows: the high order bits of the particular virtual address are used to access a specific section of said translation tables, which relate to a particular frame or segment, where upon a search is then performed on the lower bits to see if a particular virtual address is contained therein and, if so, what real address is associated therewith. Each page table pointed to by a virtual frame address contains the real locations of all of the pages in one of the frames. Therefore if a particular frame is divided into for example, 16 pages there would be 16 page tables, for each frame, and a separate frame table which would have the entries pointing to a particular set of individual page tables. It should be understood that the above description is generalized in nature and that there are many different ways of organizing the address conversion utilizing the page tables, as well as the means for addressing same, starting with the CPU produced virtual address. In the subsequent description of the preferred form of the invention as set forth and disclosed in the embodiment there will be a detailed description of the hash address tables (HAT) and the inverted page tables (IPT) which, in essence, are functionally organized as set forth above.

When making the actual address translation, regardless of the details of the overall system organization and use of the page tables, the proper entry point into the page-frame tables is made and the page tables are accessed using the presented virtual address as the argument and, usually after a plurality of memory accesses, the desired entry in the page tables is found. At this point a check is usually made to determine if all system protocols have been followed and if so, the real address of the requested page in memory is accessed from the page table. The byte portion of the virtual address is essentially a relative address and is the same in the virtual page as in the real page whereby once the desired real page address portion of the virtual address has been translated, the byte portion is concatenated onto the real page address location to provide the real byte address in main storage.

As is well known in current virtual memory systems, in order to avoid having to translate a virtual address each time the memory is accessed, current translations of recently used virtual addresses to real addresses are retained in a special set of rapidly accessible tables or high speed memories referred to as Directory Look-Aside Tables (DLAT) or Translation Look-Aside Buffers (TLBs) as used in the present invention. These tables or buffers are conventionally special high speed or rapidly accessible memories which may be accessed much faster than the previously described page frame tables whereby frequently used virtual addresses may be stored in this table and accessed very rapidly with the resultant saving of a great deal of execution time within the computer. The efficiency of such TLB address translation systems is predicated upon the fact that, subsequent to the first access to a particular virtual page, there will be a great many accesses to the same page during a given program execution. As indicated above, even though subsequent accesses are to different lines and bytes within a page, the virtual to real page address translation is the same for that page regardless of which line or byte is being addressed.

The use of the TLBs significantly reduces the number translations that must be made (in the page frame tables) and thus has a considerable effect on the performance of the overall virtual memory system.

As stated previously, virtual memory systems have been known in the computer arts for many years. It is also well known that the virtual addresses must be translated into real addresses via some sort of relocation or address translation means wherein the translatability of the virtual address into the real memory address must be assured. While it would be impossible to list all patents and articles relating to this sbject, the following prior art is intended to be exemplary of typical address translation mechanisms and represents the closest prior art known to the inventors.

U.S. Pat. No. 3,828,327 of Berglund et al describes a prior storage control technique for extending the memory by means of adding a high order bit to the address which high order bit is not part of the program apparent address but is controlled by the different system modes, such as interrupt mode, I/O mode, etc. This patent relates to a memory extension system but is provided together with appropriate address translation hardware. U.S. Pat. No. 4,042,911 of Bourke et al also discloses a system for extending main storage and explicitly includes address translation means therewith. Neither of these two patents disclose the virtual address expansion concept nor the provision of special lock bits in both the TLBs and page frame tables.

An article entitled "The 801 Minicomputer," by George Radin, published in ACM SIGPLAN NOTICES, Vol. 17, No. 4, Apr. 1982, pages 39-47, includes a general description of an experimental computer whose operational characterisitics depend to a large extent on a very fast memory subsystem in which the present relocation mechanism would have particular utility.

U.S. Pat. No. 4,050,094 of Bourke et al discloses a memory organization including an address relocation translator which includes among other things stack segmentation registers. The particular segmentation registers disclosed in this patent are for the purpose of storing a real assigned address of a physical block in the main memory rather than for storing an expanded virtual address as utilized with the present invention.

U.S. Pat. 4,251,860 of Mitchell et al, discloses a memory addressing system including virtual addressing apparatus for implementing a large virtual address memory. The patent describes a splitting of virtual address into a segment and offset portion however, the segment portion and associated segment registers are used as a convenient way of splitting the address and do not operate in any analogous manner to the adddress translation scheme of the present invention.

U.S. Pat. 4,037,215 of Birney et al, discloses a system very similar to that of the previously referenced U.S. Pat. No. 4,050,094, in that a series of segmentation registers are utilized for pointing to specific real memory blocks. This patent additionally shows the use of 'read only' validity bits tied into the specific segmentation registers. These bits have little analogy to the special purpose lock bits provided in the hardware of the present relocation mechanism.

U.S. Pat. No. 4,077,059 of Cordi et al, discloses a hierarchical memory system which includes the provision of special controls to facilitate journalling and copyback. A plurality of dual memories is involved in this patent wherein the current version of data is kept in one of the memories and changes are noted in the other to facilitate subsequent journalling and copyback operations. The hardware and controls of this patent bear little resemblance to the lock bit system of the present invention.

U.S. Pat. No. 4,053,948 of Hogan et al, discloses an address translation system in which special provisions including a counter are included with each entry in a Directory Look-Asid Table (DLAT).

U.S. Pat. No. 4,218,743 of Hoffman et al is exemplary of a number of patents listed below which relate to the IBM System/38 relocation architecture. This particular patent illustrates a simplification of the manner in which I/O handles addressing in a virtual storage computer system. Other patents related to the subject of the virtual storage system are: U.S. Pat No.4,170,039, 4,251,860, 4,215,402.

U.S. Pat. No. 4,020,466 of Cordi et al also discloses a memory system which incorporates a special facilities to facilitate journalling and copyback procedures. The patent has no relationship to the locking bit control means of the present invention.

U.S. Pat. No. 3,942,155 of Lawlor discloses a form of segment partitioning in a virtual memory system, however, the segmenting used in this patent is quite different from the segmenting operation of the present invention which is utilized to expand the virtual address.

U.S. Pat. No. 4,215,402 is cited as exemplary of the use of various hashing schemes for accessing a virtual memory translation mechanism

SUMMARY OF THE INVENTION

The present invention covers a combined table which may be used in the system of copending application Ser. No. PCT/US82/01829 or any other system covering the translation of virtual memory addresses to real memory addresses which utilize hashed addresses formed from the virtual addresses being looked up in order to further access page table containing the respective virtual addresses for each real memory address. The present invention provides means for hashing a selected virtual address to produce a hashed address and a combined table in memory including a first list of the respective virtual address of each memory address, and a second list connecting each hashed address with a predetermined initial virtual address of a linked group of virtual addresses each of which when hashed produces the connected hashed address. The system further includes means for sequentially searching through each linked group in the table until the selected virtual address is located, and means responsive to this location for accessing from the first list, the real memory address of the located virtual address.

The use of this combined table results in a substantial reduction in the amount of hardware needed to support the function of translating or converting virtual memory addresses to real memory addresses.

BRIEF DESCRIPTION OF THE DRAWINGS

Referring now to the drawings, wherein a preferred embodiment of the invention is illustrated, and wherein like reference numerals are used throughout to designate like parts;

FIGS. 18.1, 18.2 and 18.3 illustrate diagrammatically the format of three of the fields utilized for each page reference in each of the Translation Look-Aside Buffers. It is noted that there are two separate Translation Look-Aside Buffers in the presently disclosed embodiment and that there are sixteen real page references stored at any one time in each of said buffers.

DESCRIPTION OF THE PREFERRED EMBODIMENT

Figure 1:
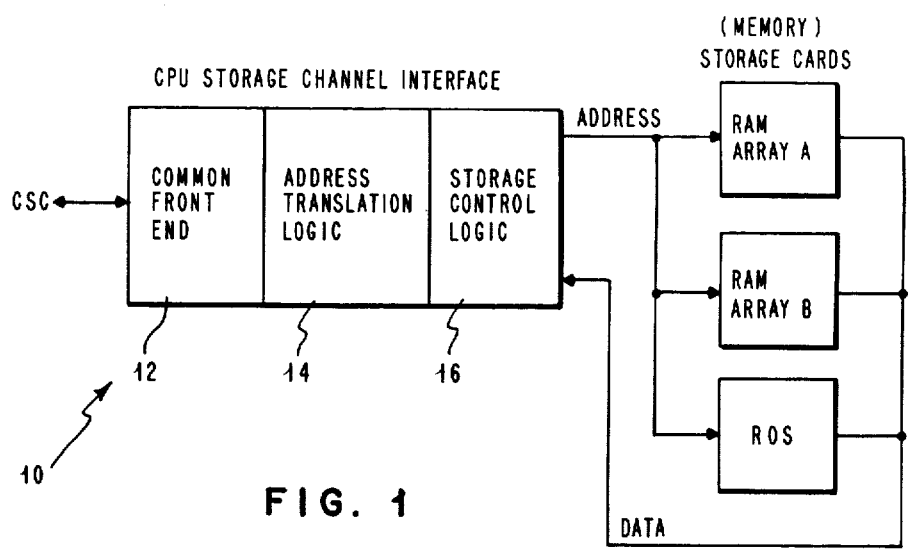
FIG. 1 comprises a functional block diagram of the major portions of the address translation and access control system used in the present invention.

The present invention is implemented by the system described in copending application Ser. No. PCT/US82/01829 which will be hereinafter described in detail.

The translating mechanism contains the logic required to interface with up to 16 M bytes of storage. Storage can be interleaved or non-interleaved, and static or dynamic. The translation mechanism is functionally divided into three sections (see FIG. 1). The CPU storage channel interface (CSC) 10 logic consists of the Common Front End (CFE), section 12 which provides the proper protocol from the storage channel to the Address Translation Logic 14 and Storage Control Logic 16. All communication to and from the storage channel is handled by this logic. The Address Translation Logic provides the translation from a virtual address received from the storage channel to a real address used to access storage. This logic contains a translation look-aside buffer (TLB) organized as 2-way set associate with 16 congruence classes. Logic is provided that automatically reloads TLB entries from page tables in main storage as required. The Storage Control logic 16 provides the interface from the Address Translation Logic 14 to storage. Dynamic memory refresh control is also provided by this logic.

It should be noted at this point that the present invention relates primarily to the novel structural combination and functional operation of well-known computer circuits, devices and functional units and not in the specific detailed structure thereof. Accordingly, the structure, control, and the arrangement of these well-known circuits, devices and blocks are illustrated in the drawings by the use of readily understandable block representation and functional diagrams that show only these specific details pertinent to the present invention. This is done in order not to obscure the invention with structural details which would be readily apparent to those skilled in the art in view of the functional description of same. Also, various portions of these systems have been appropriately consolidated and functionally described to stress those features pertinent to the present invention. The following description will allow those skilled in the art to appreciate the possibilities and capabilities of the disclosed memory subsystem and further would allow its ready incorporation into any one of a variety of computer architectures.

FIG. 1 illustrates the above described functional portions of the present address translation system which would be appropriately located on a single logic chip in a very large scale integrated circuit technology.

Whether an address is translated (treated as virtual) or treated as real in the present system is controlled by the value of a Translate Mode bit (Tbit) on the CPU Storage Channel (CSC). Each device which places a request on the CSC controls the value of the Translate Mode bit for each request. The T bit is taken from the appropriate field of memory access instruction provided by the CPU. For storage accesses generated by I/O devices, the T bit value is generated by the attaching adapter. When the T bit is one, storage addresses (instruction fetch, data load, data store) are subject to translation. When the T bit is zero, storage addresses are treated as real.

Within the herein disclosed architecture, storage protection is not effective for storage requests which are not subject to translation.

Reference and change recording is effective for all storage requests, regardless of whether they are subject to translation.

For addresses subject to translation, the translation operation logically proceeds as follows.

Various implementations may perform different parts of this function in parallel rather than in strict logical sequence as described subsequently.

The present address translation mechanism implements a "single level storage" addressing structure. The address translation mechanism provides support for the following in the herein disclosed preferred embodiment:

1. Multiple independent virual address spaces.
2. Address space size of 4 gigabytes.
3. Demand paging.
4. Page size of 2048 or 4096 bytes.
pb 5. Storage protection.
6. Shared segments, for instructions and data.
7. Journalling and locking of 128 byte lines.
8. Real storage addressability of up to 16 megabytes.
9. Reference and change bits for each real page.
10. Hardware assist for load real address, invalidate TLB entries, and storage exception address.

Storage is treated as if it were mapped onto a single 40-bit virtual address space consisting of 4096 segments of 256 megabytes each. The 32-bit address received from the CSC is converted to a 40-bit ("long form virtual") address by using the four high-order bits to select one of sixteen segment registers, the 12-bit contents of which are concatenated with the remaining 28 bits of the effective address. The translation mechanism then converts the 40-bit virtual address to a real address for storage access. As will be readily appreciated the size of the virtual address can be changed by minor changes to the hardware.

At any given instant, only 4 gigabytes of storage is addressable, namely the sixteen 256 megabyte segments specified by the sixteen segment registers. This fact allows the operating system to create multiple independent virtual address spaces by loading appropriate values into the segment registers. As a limiting case, 256 completely independent 4 gigabyte address spaces could be created in this manner, although it is more likely that some segments (such as nucleus code) would be shared across multiple address spaces.

Storage protection similar to that of the IBM System 370 is provided on a 2K or 4K byte page basis. Store protect and fetch protect are supported, with the protect key (equivalent to the key in the S/370 PSW) specified independently for each 256 megabyte segment.

Support for a Persistent Storage class is provided by a set of "lock bits" associated with each virtual page. The lock bits effectively extend the storage protection granularity to "lines" of storage (128-bytes for 2K pages, or 256-bytes for 4K pages) and allow the operating system to detect and automatically journal changes to Persistent variables. Persistent Storage class as used herein means storage which may reside permanently on disk file storage.

The following terms are used throughout this document and are defined here for clarity and convenience.

Byte Index: A number in the range 0 to 2047 (11 bits) for 2KB pages [or 0 to 4095 (12 bits) for 4KB pages] which identifies a byte within a page or page frame. The Byte Index is taken from the low-order 11 bits [12 bits] of the Effective Address.

Change Bit: A bit associated with each Page Frame which is set to "1" whenever a successful storage reference (write only) is made to that Frame.

Effective Address: The 32-bit storage channel address generated by devices on the storage channel. This can be an address generated by the host CPU for instruction fetch, data load, or data store. It can also be an address generated by an I/O device on the storage channel, such as a DMA address.

Line: A 128-bit portion of a page on a 128-byte boundary. This is the amount of storage controlled by one lockbit.

Lockbit: One of a set of 16 bits associated with each page of a Persistent Storage segment. Each lockbit is associated with one Line of storage. The combination of Transaction ID, the Write bit, and the Lockbit value for a Line determine whether a storage access request is granted or denied in a Persistent Storage segment.

Page: 2048 bytes [or 4096 bytes] of storage on a 2048-byte [4096-byte] boundary. "Page" properly refers to virtual storage while "page frame" refers to real storage, but historically the term "page" has been used for both virtual and real.

Page Frame: 2048 bytes [or 4096 bytes] of storage on a 2048-byte [4096-byte] boundary. Pages reside in Page Frames or on external storage (i.e., disk).

Page Table: The combined hash anchor table inverted page table entries in main storage that are used for translation of a virtual address to the corresponding real address (also referred to herein as HAT/IPT).

Protection Key: A 1-bit value in each Segment Register which indicates the level of authority of the currently-executing process with respect to accessing the data in the given segment. This key is similar in function to the System/370 PSW Key, but is applied individually to each segment rather than globally to all of addressable memory.

Real Address: The result of the translation operation: the Real Page Index (10 to 13 bits) concatenated with the low-order 11 bits [or 12 bits] of the Effective Address. (Real Page Index || Byte Index.)

Real Page Index: A number in the range 0 to 8192 (13 bits) which identifies a page frame in real storage. Some implementations may limit this value to as few as 10 bits, thereby restricting the maximum amount of real storage supported to 2MB of 2KB pages.

Reference Bit: A bit associated with each Page Frame which is set to "1" whenever a successful storage reference (read or write) is made to that Frame.

Segment ID: A number in the range 0 to 4095 (12 bits) which identifies a 256MB virtual storage segment. The Segment ID concatenated with the Virtual Page Index uniquely specifies a page in the 40-bit virtual address space.

Storage Key: A 2-bit value in each TLB entry which indicates the level of protection associated with one particular page. This key is similar in function to the Storage Key associated with each System/370 memory page.

TLB: Translation Lookaside Buffer. The TLB is the hardware containing the virtual-to-real mapping (in some implementations the TLB may contain only a portion of this mapping at any given time). In addition to the mapping each TLB entry contains other information about its associated page, such as Translation ID, Storage Key and Lockbits.

Transaction ID: A number in the range 0 to 255 (8 bits) which identifies the "owner" of the set of Lockbits currently loaded in a TLB entry.

Virtual Address: The 40-bit address value formed inside the present address translation mechanism by concatenation of the Segment ID with the low-order 28 bits of the Effective Address. (That is, Segment ID || Virtual Page Index || Byte Index.)

Virtual Page Index:

A number in the range 0 to 131,072 (17 bits) for 2KB pages [or 0 to 65,536 (16 bits) for 4KB pages] which identifies a page within a virtual storage segment. The Virtual Page Index is taken from bits 4-20 [4-19] of the Effective Address.

|| : Concatenation.

The hardware required to support the present address translation mechanism is described below. Note that some field widths may vary with different implementations.

The TLB consists of an arbitrary number of entries, with each entry controlling the translation of the virtual address of one page to its real address.

Details of the organization of the TLB are implementation dependent. Two implementations are possible. A content addressable memory (CAM) which would be addressed by Segment ID || Virtual Page Index and which would contain one entry per real storage frame. The index (ordinal number) of the CAM entry would be equal to the Real Page Index. A set associative TLB which would be addressed by some number of the low-order bits of the Virtual Page Index. The Real Page Index would be contained within a field in the TLB entry.

The only constraint on TLB shape is that a non-CAM implementation must be at least two-way associative. Each TLB entry can be read and written individually from the CPU using IOR and IOW instructions. TLB entries contain the following fields:

The incoming 32-bit effective address (from the CPU or an I/O device) is first expanded to a 40-bit virtual address by concatenating a segment identifier to the effective address. The virtual address is then presented to the translation hardware for conversion to the equivalent real address. Virtual addresses are translated to a real storage address by the process described below.

Figure 2:
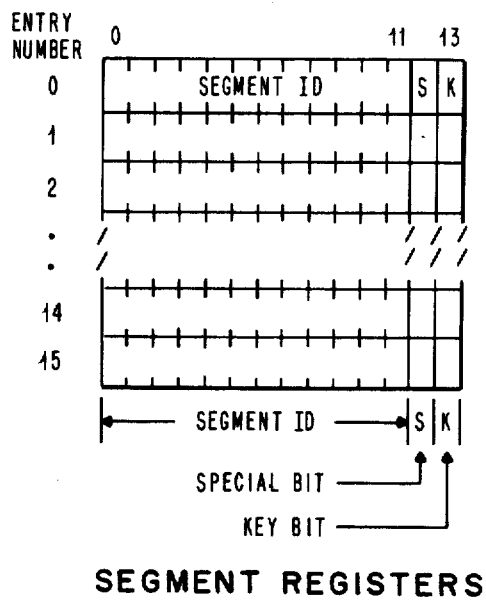
FIG. 2 is a diagrammatic illustration of the format of the Segment Registers used in the present address translation mechanism.

The high-order four bits of the incoming effective address are used to index into the segment table to select one of sixteen segments. A 12-bit segment identifier, a "special segment" bit, and a key bit are obtained from the selected segment register. The 12-bit segment identifier is used for formation of the virtual address. The special segment bit and the key bit are used for access validation as described subsequently. FIG. 2 shows the segment table format.

Figure 3:
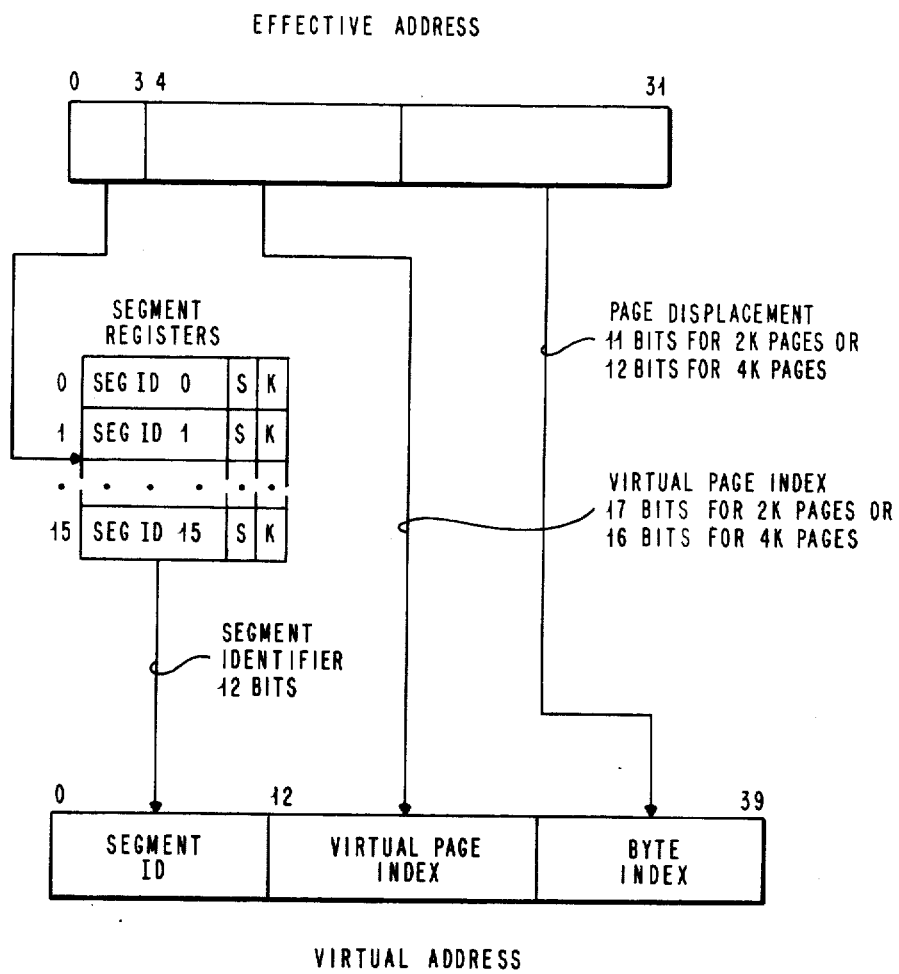
FIG. 3 is a combination functional block diagram and data flow diagram illustrating the conversion of an effective address to a virtual address.

The 12-bit segment identifier is concatenanted with bits 4 through 31 of the incoming effective address to form a 40-bit virtual address. The low order 11 bits for 2k pages, or 12 bits for 4k pages, of the effective address are used as the byte address for the selected real page. These bits are not altered by the translation process. The remaining 29(28) bits of the virtual address are then presented to the translation hardware. FIG. 3 shows the generation of the virtual address using the segment identifier and the storage effective address.

Figure 4:
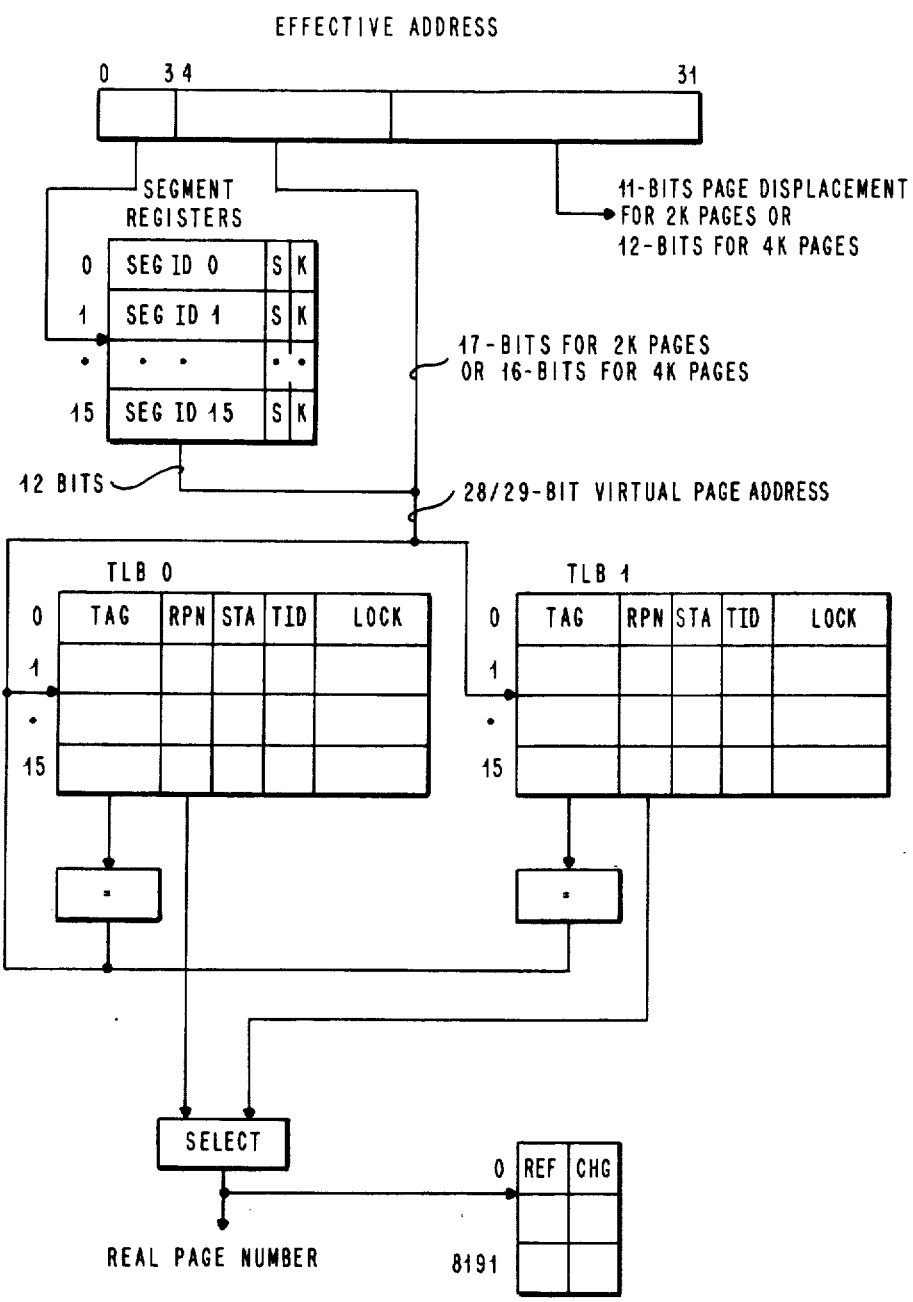
FIG. 4 is a combination functional block diagram and data flow diagram illustrating the complete address translation mechanism from an effective address to real address.
Figure 5:
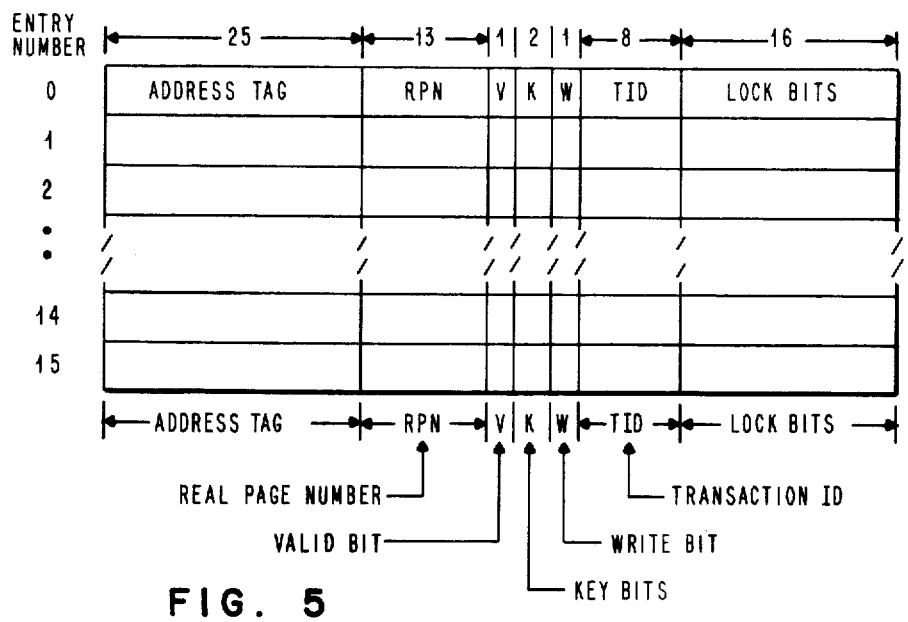
FIG. 5 is a diagram illustrating the organization and contents of the organization of the Translation Look-Aside Buffers as used in the overall address translation mechanism of the present invention.

The herein disclosed address translation system utilizes a Translation Look-aside Buffer (TLB) to contain translations of the most recently used virtual addresses (32 in the present embodiment). Hardware is used to automatically update TLB entries from main storage page tables as new virtual addresses are presented to the TLBs for translation. A simplified data-flow of the translation hardware is shown in FIG. 4 and the format of each TLB is shown in FIG. 5.

The system utilizes two two TLBs with 16 entries per TLB (2-way set associative with 16 congruence classes). The low-order 4 bits of the virtual page index are used to address both TLBs in parallel. The Address Tag entry in each TLB is compared with the segment identifier concatenated with the remaining bits of the virtual page index (25 bits for 2K pages, or 24 bits for 4K pages). If either of the two compares are equal and the TLB entry is valid (as indicated by the Valid Bit), the associated TLB contains the translation information for the given virtual address.

The Real Page Number field (RPN) in the selected TLB entry contains the number of the real page in main storage that is mapped to the given virtual address. If this is not a special segment, the access is checked for storage protect violations using the Key Bits from the TLB entry and the Key Bit from the Segment Register before the access is allowed. If this is a special segment, as indicated by the Special Bit in the segment register, lockbit processing is performed before the access is allowed. The storage protect facility is described subsequently as is special segment processing. If the access is permitted, main storage is then accessed and the reference and change bits associated with the page are updated. The setting of the reference and change bits is also described subsequently.

If no match is obtained from the two TLB compares, the address translation logic will attempt to reload the faulting TLB entry from the page table entries in main storage. The main storage page table is resident in real storage and logically consists of two parts, a Hash Anchor Table or Hash Address Table (HAT) and an Inverted Page Table (IPT). The HAT allows the mapping of any virtual address, through a hashing function, to any real page.

The Inverted Page Table (IPT) specifies the virtual address (if any) which is associated with each real page frame. It is organized as an array of entries indexed by Real Page Number, with each entry containing its associated Segment ID and Virtual Page Idex or Number.

Determining the Virtual Address for a given Real Address is trivial, since the IPT is indexed by Real Page Number. To determine efficiently the Real Address for a given Virtual Address requires a hashing function to map the Virtual Address to an anchor point and a chain of entries to resolve hash collisions as will be well understood by those skilled in the art.

Figure 6:
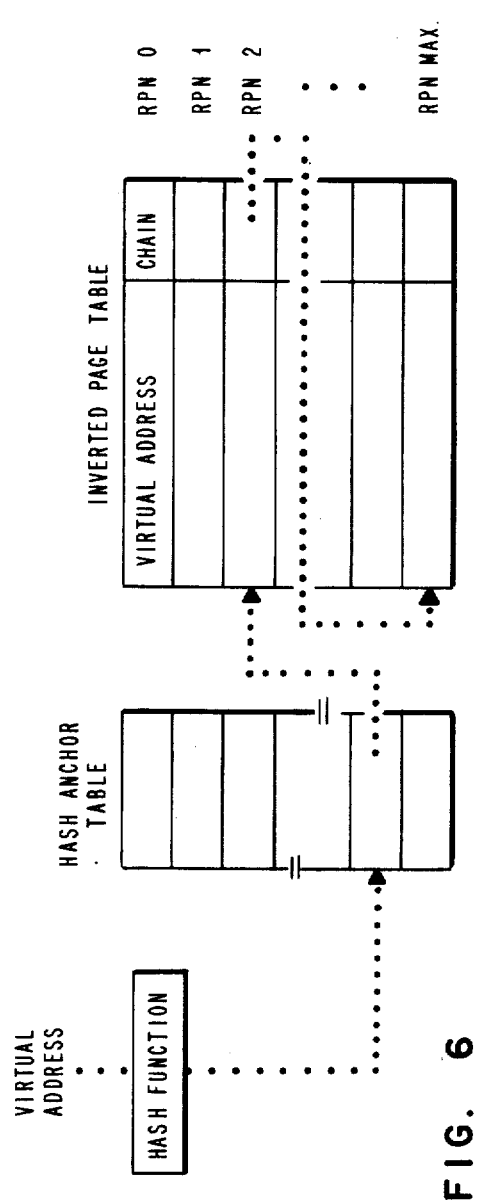
FIG. 6 is a conceptual illustration of the combined Hash Anchor Table/Inverted Page Table and a data flow diagram therefore illustrating the operation of these tables when no TLB entry is found for a given virtual address.

The Hash Anchor Table (HAT) is logically separate from the IPT (though it is physically incorporated into the IPT for hardware efficiency reasons). As shown in FIG. 6, a hash function converts a Virtual Address into the index of an entry in the HAT, which in turn points to the first of a chain of IPT entries (real pages) with the same HAT index. A search of the chain of IPT entries for a match on Virtual Address will yield the IPT index (thus Real Address) for the desired Virtual Address, or will terminate with no match found (page not mapped). In the present embodiment there is one HAT and IPT entry for each page of real storage.

Translation of a virtual to a real address is accomplished by first exclusive or-ing selected low-order bits of the effective address with bits from the segment identifier. This "hashed" address is then used to index into the HAT. The selected HAT entry is a pointer to the beginning of a list of IPT entries to be searched for the given virtual address. Entries in the list of IPT entries to be searched are linked together by a pointer in each entry that points to the next IPT entry to be searched. A flag bit in the IPT entry is used to indicate the end of the search chain. Note that since the hashing function can produce the same HAT address for several different effective addresses, there can be several virtual address entries in the IPT chain to be searched.

Figure 7:
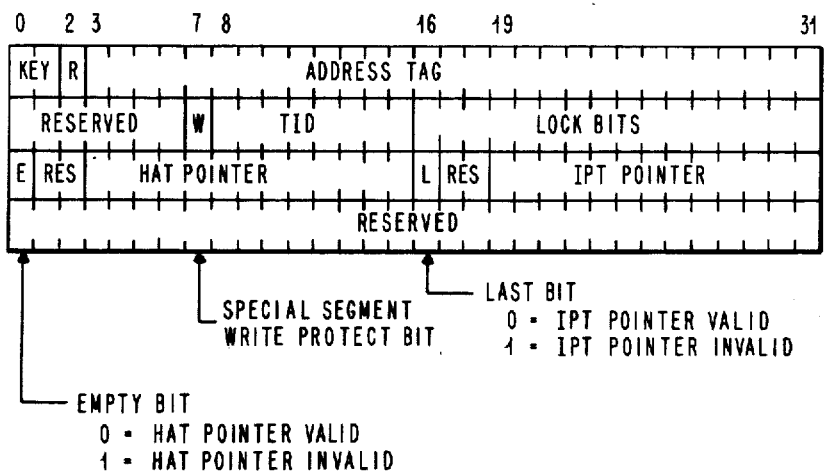
FIG. 7 comprises an illustrative diagram of the structure and contents of the actual Hash Anchor Table/Inverted Page Table as it is stored in memory.

For hardware efficiency reasons, the HAT and IPT are combined into one structure which can be addressed by one indexing structure. There is one entry in the combined HAT and IPT for each page of real storage. For example, 1 megabyte of real storage organized as 2K-byte pages requires 512 entries and 512k byte organized as 4K-pages requires 128 entries. The format of the combined HAT and IPT page entries is shown in FIG. 7; the page entry of FIG. 7 represents one page of real memory. The HAT/IPT contains 16 bytes for each page entry and starts on an address that is a multiple of the table size.

The first word in each page entry contains the address tag which is composed of the segment identifier concatenated with ( || ) the virtual page index. Note that for 2K pages the address tag is 29 bits, and for 4K pages it is 28 bits. If a page size 4K is used, the 28-bit address tag is stored in bits [3 thru 30]. Bit 2 is reserved. The first word also contains a 2-bit key which is used for storage protection as described later.

The second word contains the HAT pointer, IPT pointer, and valid bits for each pointer. Use of the pointer is described subsequently.

The third word contains the write protect, lock bits, and TID for special segments. Use of these fields is described subsequently also.

The fourth word is not used for TLB reloading and is reserved for possible future use.

The HAT/IPT base address is a field in the Translation Control Register (described subsequently, FIG. 12), and is used for computing the beginning address of the main storage page table. The value contained in the HAT/IPT base address is multiplied by the amount shown in Table I depending on storage and page size to obtain the starting address of the main storage page table. Also shown in Table I, is the size of the HAT/IPT for each storage size and page size.

TABLE I

| HAT/IPT Base Address Multiplier | | | |
|---|---|---|---|
| Storage SIZE Bytes | Page Size Bytes | HAT/IPT [Entries/ Bytes] | HAT/IPT Base Address Multiplier |
| 64K | 2K | 32/512 | 512 |
| 64K | 4K | 16/256 | 256 |
| 128K | 2K | 64/1K | 1024 |
| 128K | 4K | 32/512 | 512 |
| 256K | 2K | 128/2K | 2048 |
| 256K | 4K | 64/1K | 1024 |
| 512K | 2K | 256/4K | 4096 |
| 512K | 4K | 128/2K | 2048 |
| 1M | 2K | 512/8K | 8192 |
| 1M | 4K | 256/4K | 4096 |
| 2M | 2K | 1024/16K | 16384 |
| 2M | 4K | 512/8K | 8192 |
| 4M | 2K | 2048/32K | 32768 |
| 4M | 4K | 1024/16K | 16384 |
| 8M | 2K | 4096/64K | 65536 |
| 8M | 4K | 2048/32K | 32768 |
| 16M | 2K | 8192/128K | 131072 |
| 16M | 4K | 4096/64K | 65536 |

HAT ADDRESS GENERATION

As stated previously the HAT index is computed by exclusive or-ing selected bits from the segment identifier with bits from the effective address. The number of bits used is chosen so that the resulting index will select one of n entries in the HAT/IPT. This hashing operation is shown in FIG. 6. The bits used for generation of the HAT index are listed in Table II. The storage address of the selected HAT entry is computed as: HAT/IPT Base Address+HAT Index || 0100.

The selected HAT entry is accessed and the Empty Bit checked to determine if the IPT search chain is empty. If the Empty Bit is one, there is no page mapped to the given virtual address and a "page vault" is reported as described later. If the Empty Bit is zero, entries in the IPT search chain exist and entries in the IPT are searched. The HAT Pointer field of the selected HAT entry is then used as a pointer to the start of the IPT search chain.

TABLE II

| HAT/IPT Index Generation Source Fields | | | | |
|---|---|---|---|---|
| Storage Size Bytes | Page Size Bytes | Segment Register Bits | Effective Address Bits | Index [# Bits] |
| 64K | 2K | 7:11 | 16:20 | 5 |
| 64K | 4K | 8:11 | 16:19 | 4 |
| 128K | 2K | 6:11 | 15:20 | 6 |
| 128K | 4K | 7:11 | 15:19 | 5 |
| 256K | 2K | 5:11 | 14:20 | 7 |
| 256K | 4K | 6:11 | 14:19 | 6 |
| 512K | 2K | 4:11 | 13:20 | 8 |
| 512K | 4K | 5:11 | 13:19 | 7 |

TABLE II-continued

| HAT/IPT Index Generation Source Fields | | | | |
|---|---|---|---|---|
| Storage Size Bytes | Page Size Bytes | Segment Register Bits | Effective Address Bits | Index [# Bits] |
| 1M | 2K | 3:11 | 12:20 | 9 |
| 1M | 4K | 4:11 | 12:19 | 8 |
| 2M | 2K | 2:11 | 11:20 | 10 |
| 2M | 4K | 3:11 | 11:19 | 9 |
| 4M | 2K | 1:11 | 10:20 | 11 |
| 4M | 4K | 2:11 | 10:19 | 10 |
| 8M | 2K | 0:11 | 9:20 | 12 |
| 8M | 4K | 1:11 | 9:19 | 11 |
| 16M | 2K | 0||0:11 | 8:20 | 13 |
| 16M | 4K | 0:11 | 8:19 | 12 |

The HAT pointer previously accessed is used as the starting index into the IPT. The storage address of the first IPT entry is computed as: HAT/IPT Base Address+HAT Pointer || 0000.

An access is made to the first entry in the IPT and the address tag compared to the given virtual address. If the two are equal, the real page assigned to the virtual address has been located and the faulting TLB entry can be reloaded. Reloading of the TLB entry will be described subsequently. If the two are not equal, the IPT search continues by accessing the IPT pointer. The IPT pointer address is computed as: HAT/IPT Base Address+HAT Pointer || 0100. The IPT pointer is then accessed and the Last Bit checked to determine if there are additional entries in the IPT search chain. If the Last Bit is a zero, there are additional entries and the search process continues. If the Last bit is a one, there are no additional IPT entries to be searched, and a "page fault" is reported.

If there are additional IPT entries to be searched, the address of the next IPT entry for searching is computed as: HAT/IPT Base Address+IPT Pointer || 0000. This address is used to access the next entry in the IPT search chain and the address tag contained in the selected entry is compared to the given virtual address. If the two are equal, the real page assigned to the virtual address has been located and the faulting TLB entry can be reloaded. If the two are not equal, the search process continues by accessing the pointer to the next entry to be searched. The address of the pointer to the next entry is computed as: HAT/IPT Base Address+IPT Pointer || 0100. This word is then accessed and the Last Bit is checked to determine if there are additional entries in the IPT search chain. If the Last Bit is a one, there are no additional IPT entries to be searched, and a "page fault" is reported. If the Last Bit is a zero, there are additional entries and the search process continues. The current IPT Pointer is used to access subsequent entries using the previously described process, until either the address tag in the IPT entry is equal to the given virtual address, or no match is found and the Last Bit indicates no further entries exist in the search chain.

The following is a synopsis of the steps to be followed to convert a Virtual Address to the index of its IPT entry (and thus to its corresponding Real Address).

(1) Select the low-order 13 bits of the Virtual Page Number. This will be bits 7–19 of the Effective Address if 4KB pages are used, or bits 8–20 if 2KB pages are used.

(2) Select the 12-bit contents of the Segment Register specified by bits 0–3 of the Effective Address. Concatenate a '0' bit on the left to form a 13-bit field.

(3) Exclusive-OR the two 13-bit fields from steps (1) and (2) to form a 13-bit Hash Anchor Table entry number.

(4) Shift the value from step (3) left 4 bits. This forms the byte offset of the start of the IPT entry which physically contains the desired HAT entry.

(5) Compute the address of the HAT/IPT entry. This is done by adding the result of step (4) to the starting address of the IPT. If the IPT is constrained to start on an appropriate power-of-two byte boundary, the "add" may be replaced by OR or concatenation.

(6) Check for empty IPT chain. Investigate the "E" ("empty") bit in the HAT/IPT entry. If E=1 then the IPT chain is empty (HAT pointer is invalid): the search terminates unsuccessfully; the virtual page is not mapped.

(7) If the IPT chain is not empty, select the HAT Pointer from the addressed HAT/IPT entry. This 13-bit value is the index of the first IPT entry in the chain of entries having the same hash result [step (3)].

(8) Shift the IPT index value left 4 bits. This forms the byte offset of the start of an IPT entry which is to be checked for a match on Virtual Address.

(9) Compute the address of the IPT entry. This is done by adding the result of step (8) to the starting address of the IPT. If the IPT is constrained to start on an appropriate power-of-two byte boundary, the "add" may be replaced by OR or concatenation.

(10) Compare for Virtual Address match. Compare the Segment ID || Virtual Page Number from the IPT entry (28 or 29 bits) with the segment register contents specified by the Effective Address [step (2)] concatenated with the Virtual Page Number in the Effective Address.

(11) If a match, search has completed successfully. This entry is the one corresponding to the desired Virtual Address; its index number is equal to the required Real Page Number.

(12) If not a match, check for end-of-chain. Investigate the "L" ("last") bit in the IPT entry. If L=1 then this is the last IPT entry in this chain: the search terminates unsuccessfully; the virtual page is not mapped.

(13) If not end-of-chain, slect the IPT Pointer field from the IPT entry. This 13-bit value is the index of the next IPT entry to be investigated.

(14) Go to step (8).

Figure 7A:
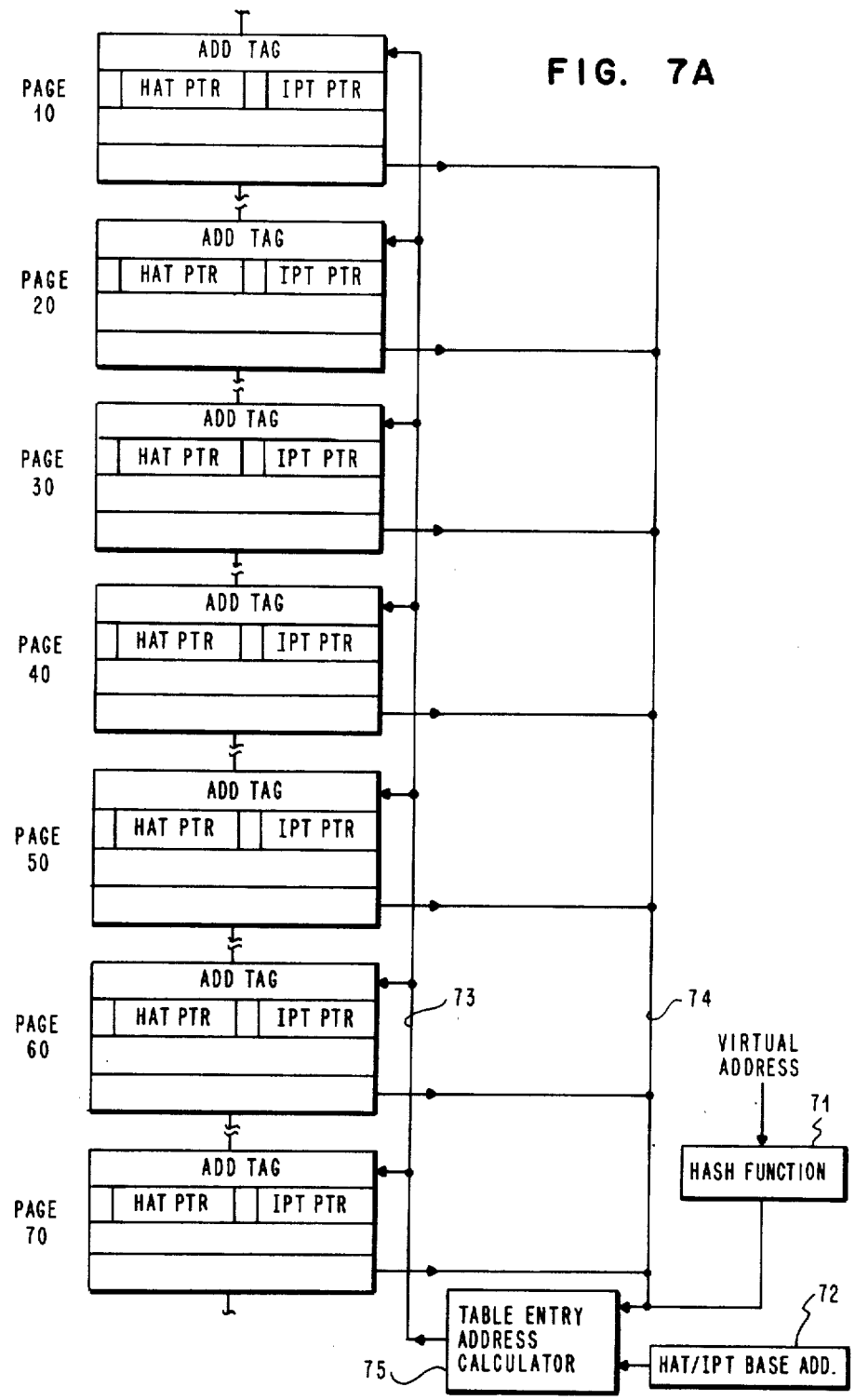
FIG. 7A is an illustrative diagram of the memory organization involving several combined HAT/IPT table entries each representative of one page of real memory.

The significance of combining the HAT and IPT into a single table structure which can be addressed by a single indexing structure may be better understood with reference to FIG. 7A which illustrates a memory organization having seven representative page entries each of which has a structure equivalent to that of the individual page entry shown in FIG. 7. These page entries represent seven pages of real memory: 10, 20, 30, 40, 50, 60 and 70. There may be hundreds or even thousands of such pages in the real memory. However, the indexing or addressing of data such as the HAT pointer or IPT pointer in a selected page entry is based upon the information stored in a single base address register 72 as shown which would be the equivalent of the base address register, i.e., HAT/IPT field subsequently described with respect to the translation control register of FIG. 12.

At this point, the understanding of the present invention may be clarified by considering how the real memory page is located for a particular virtual address using the memory organization shown in FIG. 7A. In following through the procedure to be hereinafter described with respect to FIG. 7A, it should be borne in mind that all of the functions involved and their calculation have already been described with respect to FIGS. 6 and 7. Thus, the use of these functions to locate real page address within memory organization will be described stepwise. The virtual address is hashed within hash function means 71 in the manner previously described to produce a hashed address which is applied to table entry address calculator 75 which determines the offset from the base address in register 72 to the particular page entry which contains the HAT pointer being accessed. Let us assume that this HAT pointer is contained in page entry 50; then, the calculator 75 will access page entry 50 via pointer means 73. The HAT pointer on page entry 50 will then be fetched and applied over bus 74 to table entry address calculator 75 which will then calculate the appropriate offset from base address 72 to access the particular page entry pointed to by the pointer on page 50. Let us assume that page entry 20 is pointed to. This means that page 20 is the initial member of a group of pages of which the virtual address (as represented by Add Tag) which produce the same hashed address when applied through hash function 71.

Next, a determination is made as to whether this initial page entry contains the virtual address being sought (the Add Tag is compared to the Add Tag in the virtual address being applied to function 71). If there is no comparison of the virtual address of page 20, then the IPT pointer in page entry 20 is used as the basis as previously described for accessing the next page entry in the group of linked virtual addresses. This is accomplished by applying the hashed pointer information via bus 74 to offset calculator 75 which calculates the offset from base address 72 to the next linked page entry which for purposes of the present description will be considered to be page entry 30.

A compare is then made of the address tag in page entry 30 with that of the applied virtual address. If there is still no compare, then the IPT pointer in page entry 30 is used as previously described to access the next linked page entry. In other words, we use the IPT pointer linking the next page entry on which a virtual addresses in the group sharing the same hashed address may be found. The procedure is continued as described hereinabove until a match is found between the applied virtual address and that in a particular page entry being accessed or if as previously described no comparing virtual address may be found. Let us assume that a comparison is made on page entry 30; then, page 30 is the real page address of the applied virtual address.

The utilization of the combined table is described with respect to FIGS. 7 and 7A represents a significant saving in hardware from systems which utilize separate HAT and IPT tables as diagrammatically shown in FIG. 6. Because the memory organization of FIG. 7A utilizes a single combined table, then it only requires one base address register as well as one table entry address calculator. Otherwise, two separate tables are used as shown in FIG. 6, they would respectively require a base address register as well as a table entry calculator for each table. They would also require separate pointer and fetching means for each table.

TLB Reload

If an IPT entry is found with an address tag field equal to the given virtual address, the faulting TLB entry is reloaded. Reloading consists of selecting the least recently used TLB entry for the congruence class of the faulting virtual address, and loading the selected entry with the given virtual address tag field, the corresponding real page number and the key bits. If this is a special segment as indicated by the Special Bit in the segment register, then the Write Bit, TID, and LOCK bits are also reloaded.

Hardware is used to determine the least recently used TLB entry in each congruence class. Since the low-order bits of the virtual address determine the congruence class, the only decision to be made is which TLB should have the selected entry replaced. One of the two TLBs will then be selected based on which TLB contained the entry in the given congruence class that was least recently referenced.

Once the least recently used TLB entry for the given congruence class has been determined, the selected TLB entry can be reloaded. The Address Tag field and Key bits are reloaded from the IPT entry contained in main storage. The address of this entry was previously computed in the IPT search process. Since the IPT index computed in the search process is equal to the real page number, this value is used to reload the Real Page Number field in the TLB. If this is a special segment, as indicated by the Special Bit in the segment register, the TID and Lock Bits are also reloaded. The TID and Lock Bits are reloaded by accessing the third word in the selected IPT entry.

STORAGE ACCESS CONTROL

The present address translation mechanism provides two access control facilities. The first facility applies to non-special segments and provides read/write protection for each page of real storage. The second facility applies only to special segments and is used to support Persistent data types. These access control facilities apply only to translated accesses. If a violation is detected by either facility, the storage access is terminated and an exception reported as described subsequently.

STORAGE PROTECTION PROCESSING

Storage protection processing applies only to non-special segments. Once a correspondence between a virtual and a real address has been determined by the TLB, the requested access is verified to insure proper access authority. This facility allows each page to be marked as no access, read only, or read/write.

Access control is a function of the one-bit protection key in the selected Segment Register, the two-bit key in the TLB entry, and whether the access is a load or store operation. Access is controlled as shown in Table III.

TABLE III

| | Protection Key Processing | | |
|---|---|---|---|
| Key in TLB | Protect Key in Seg Reg | Access Permitted | |
| | | Load | Store |
| 00 | 0 | Yes | Yes |
| | 1 | No | No |
| 01 | 0 | Yes | Yes |
| | 1 | Yes | No |
| 10 | 0 | Yes | Yes |
| | 1 | Yes | Yes |
| 11 | 0 | Yes | No |
| | 1 | Yes | No |

If the access is not allowed, then the translation is terminated, and a Protection exception is reported to the CPU.

LOCKBIT PROCESSING

Lockbit processing is applied only to special segments as indicated by the Special bit in the selected segment register. Special segments are used to support Persistent data. Lockbit processing allows the operating system to automatically monitor changes to Persistent variables and to journal changes, create shadow pages, and perform other processing required for data base consistency. Lockbits also extend the protection from the page size resolution (either 2K or 4K-bytes) provided by the storage protect facility to lines of either 128 or 256 bytes. A resolution of 128 bytes is provided for 2K pages, and 256 bytes for 4K pages. The individual line lockbit is selected by bits [21:24] of the effective address for 2 K pages, and bits [20:23] for 4K pages.

Access control is a function of the one-bit write key in the selected TLB entry, the lockbit value of the selected line, the TID compare, and whether the access is a load or store operation. Access is controlled as shown in Table IV following.

TABLE IV

| | Lockbit Processing | | |
|---|---|---|---|
| Current TID Compared To TID in TLB | Write Bit in TLB | Lockbit Value for Selected Line | Access Permitted |
| | | | Load | Store |
| Equal | 1 | 1 | Yes | Yes |
| | | 0 | Yes | No |
| | 0 | 1 | Yes | No |
| | | 0 | No | No |
| Not Equal | — | — | No | No |

The Data storage exception is used to report a lockbit violation. This violation may not represent an error; it may be simply an indication that a newly modified line must be processed by the operating system.

Reference and change bits are provided for each page of real storage. These bits are in arrays external to the present address translation mechanism and are updated as required for each storage access. The reference bit is set to one if the corresponding real page is accessed for either a read or write operation. The change bit is set if the corresponding page is written.

Reference and change bits are accessible via I/O read and write instructions (IOR and IOW) from the associated CPU. Reference and change bits for each page of real storage start at the I/O address specified by the I/O Base Address Register plus X'1000'. The I/O address of the reference and change bits for a given page is given by the following expression.

Figure 8:
FIG. 8 illustrates the format of the reference and change bits as utilized with each I/O address.

I/O Address = Address Specified by I/O Base Address Register + X'1001' + Page Number Each I/O address contains the reference and change bits for one page of real storage. The format of the reference and change bits is shown in FIG. 8.

Data transferred by accesses to reference and change bits is defined as follows:
Bits 0:29: Zeros.
Bit 30: Reference Bit. Set to one when the corresponding real page is accessed for a read or write operation.
Bit 31: Change Bit. Set to one when the corresponding real page is accessed for a write operation.

Reference and change bits are not initialized by hardware. They are initialized and cleared by system software via IOW instructions. Since reference and change bits can be set by execution of a program to set or clear the reference and change bits, a write to clear or set reference and change bits followed by a read, will not necessarily read the same data which was written.

CONTROL REGISTERS

There are a number of control registers used for defining the storage configuration, page table address, and I/O base address. These registers are initialized (loaded) by system software via I/O read and I/O write (IOR and IOW) instructions from the CPU. Their organization and format are shown in FIGS. 9 through 18. These registers are accessible only from supervisor state.

Figure 9:
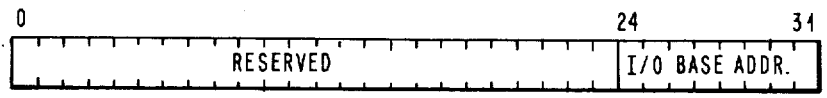
FIG. 9 is a diagrammatic illustration of the I/O Base Address Register configuration.

The I/O Base Address Register specifies which 64K block of I/O addresses are assigned to the translation system. The I/O base address is equal to the value contained in the I/O Base Address Register multiplied by 65536 (x'10000'). The format of the I/O Base Address Register is shown in FIG. 9.

The I/O Base Address Register is defined as follows:

Bits 0:23: Reserved.

Bits 24:31: I/O Base Address. This 8-bit value defines which 64K byte block of I/O addresses are assigned to the translation system (i.e. these 8 bits are the most significant 8 bits) in O address recognized by the translation system.

Figure 10:
FIG. 10 is a diagrammatic illustration of the format of the RAM Specification Register.

The "RAM Specification Register" defines the RAM size, RAM starting address, refresh rate, and whether parity checking or Error Correcting Code (ECC) is used. ECC and parity checking features do not form a part of the present invention and, other then mentioning facilities provided for their handling, will not be described further. The format of the RAM Specification Register is shown in FIG. 10.

The RAM Specification Register is defined as follows:

Bits 0:10: Reserved.

Bits 10:18: Refresh Rate. This 9-bit quantity determines the refresh cycle rate. The refresh cycle rate is equal to the value contained in bits [10:18] multiplied by the CPU clock frequency. A Refresh Rate of zero disables refresh. The refresh rate value can be computed by dividing the required memory refresh rate by the CPU clock frequency. For example, in a system with dynamic memory that requires refreshing 128 rows every 2 msec., the refresh interval per row is 128/2 msec., which is 15.6 $\mu$sec. For a 200 nsec. CPU clock, the required refresh rate count is 15.6 $\mu$sec/200 nsec., which is 78 (X'04E'). This requires loading the Refresh Rate with X'04E'.

The Refresh Rate is initialized to X'01A' as part of the POR sequence.

Bits 20:27: RAM Starting Address. This eight-bit field defines the starting address of RAM for both translated and non-translated accesses.

Bits 28:31: RAM Size. This four-bit field defines the size of the RAM attached to the present translation system.

ROS SPECIFICATION REGISTER

Figure 11:
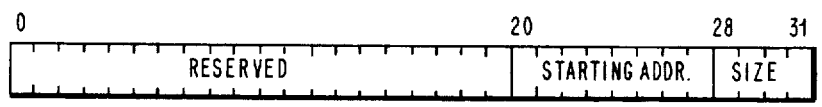
FIG. 11 is a diagrammatic illustration of the format of the ROS Specification Register.

The ROS Specification Register defines the ROS starting address, ROS size, and whether parity is provided by ROS. ROS can be accessed in both translated and non-translated mode. The format of the ROS Specification Register is shown in FIG. 11.

The ROS Specification Register is defined as follows:

Bits 0:19: Reserved.

Bits 20:27: ROS Starting Address. This eight-bit field defines the starting address of ROS for both translated and non-translated accesses.

Bits 28:31: ROS Size. This four bit field defines the size of ROS attached to the translation system.

TRANSLATION CONTROL REGISTER

Figure 12:
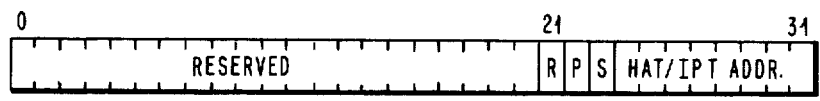
FIG. 12 is a diagrammatic illustration of the format of the Translation Control Register.

The Translation Control Register (TCR) specifies if interrupts are generated on successful hardware TLB reload, if parity is used on the reference and change array, the size of each page (either 2K or 4K-bytes), and the starting address of the main storage page table (combined HAT and IPT). The format of the Translation control Register is shown in FIG. 12.

The Translation Control Register is defined as follows:

Bits 0:20: Reserved.

Bit 21: Enable Interrupt on Successful TLB Reload. This bit is used to enable reporting of successful hardware TLB reloading. When set to one, a successful hardware TLB reload will cause an exception reply to be generated, and the TLB Reload bit (bit 22) in the SER to be set to one. When Enable Interrupt On Successful TLB Reload is set to zero, successful hardware reloading of TLB entries is not reported. This facility can be used for software performance measurement of the TLBs.

Bit 22: Reference and Change Array Parity Enable. This bit is used to indicate if parity is used on the external reference and change array. If this bit is set to one, parity is used on the reference and change array. If this bit is set to zero, parity is not used on the reference and change array.

Bit 23: Page Size. A value of zero is used for 2K-byte pages, and a value of one is used for 4K-byte pages.

Bits 24:31: HAT/IPT Base Address. This 8-bit field is used to specify the starting address of HAT/IPT entries in main storage. The value contained in this field is multiplied by a constant determined by the size of real storage and the page size, to determine the starting address of the HAT/IPT entries. For a page size of 2K bytes, the base address is specified by bits [24:31], and for 4K pages by bits [25:31]. The constant for each storage size and page size configuration is listed in Table I.

The Storage Exception Register (SER) is used to report errors in the translation process, and system errors, for a storage access. Individual bits are provided to report each error condition detected by the translation system. In the case of multiple errors, each error is reported by the setting of the appropriate bit. Bits which were set by previous errors are not reset by subsequent errors.

Figure 13:
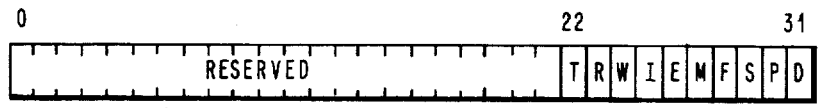
FIG. 13 is a diagrammatic illustration of the format of the Storage Exception Register.

The SER is initialized to zero by the POR sequence. Once an exception is reported, system software is responsible for clearing the SER after the exception has been processed. The format of the Storage Exception Register is shown in FIG. 13.

The Storage Exception Register is defined as follows:

Bits 0:21: Reserved.

Bit 22: Successful TLB Reload. This bit is set to one when Interrupt On Successful TLB entry is successfully reloaded.

Bit 23: Reference And Change Array Parity Error. This bit is set to one when a parity error is detected in the reference and change array.

Bit 24: Write to ROS Attempted. This bit is set to one when an attempt is made to write to an address contained in the ROS address space.

Bit 25: IPT Specification Error. This bit is set to one when an infinite loop is detected in the IPT search chain. An infinite loop can be created by a system software error which incorrectly specifies IPT pointer values that result in an IPT pointer pointing to a previous entry in the current IPT search chain (an infinite loop).

Bit 26: External Device Exception. This bit is set to one when an exception is caused by a device on the RSC other than ROMP.

Bit 27: Multiple Exception. This bit is set to one when more than one exception (IPT Specification Error, Page Fault, Specification, Protection, or Data) has occurred before the exception indication has been cleared in the Storage Exception Register.

This bit normally indicates that system software has failed to process an exception. However, if an exception is caused by a Load Multiple (LM) or Store Multiple (STM) instruction, this bit can be set since the LM or STM instruction will attempt to load or store all of the registers specified in the instruction before the instruction is terminated due to an exception.

Bit 28: Page Fault. This bit is set to one when translation is terminated because no TLB entry or main storage page table entry contains the translation for a virtual address.

Bit 29: Specification. This bit is set to one when translation is terminated because two TLB entries were found for the same virtual address.

Bit 30: Protection. This bit is set to one when translation is terminated because Storage Protection processing for a non-special segment determines that a storage access is not allowed.

Bit 31: Data. This bit is set to one when translation is terminated because Transaction ID/Lockbit processing for a special segment determines that a storage access is not allowed.

Figure 14:
FIG. 14 is a diagrammatic illustration of the format of the Storage Exception Address Register.

The Storage Exception Address Register (SEAR) contains the effective storage address causing the exception reported by the Storage Exception Register (SER) for data load and store requests from the CPU. The SEAR is not loaded for exceptions caused by ROMP instruction fetches, or by external device. The format of the Storage Exception Address Register is shown in FIG. 14.

The Storage Exception Address Register is defined as follows:

Bits 0:31: Storage Exception Address. The 32-bit effective storage address causing the exception reported by the SER. In the case of multiple errors (bit 27 of the SER set to one), the address contained in the SEAR is the address of the oldest exception.

Figure 15:
FIG. 15 is a diagrammatic illustration of the format of the Translated Real Address Regiter.

The Translated Real Address Register (TRAR) contains the real storage address determined by the Compute Real Address operation. The Compute Real Address function is used to determine if a virtual address is currently mapped in real storage, and the corresponding real address if the virtual address is mapped. The Compute Real Address function is described subsequently. The format of the Translated Real Address Register is shown in FIG. 15.

The Translated Real Address Register is defined as follows:

Bit 0: Invalid Bit. This bit is set to one if the translation failed, and is set to zero if the translation is successful.

Bits 1:7: Zeros. This seven-bit field is always zero.

Bits 8:31: Real Storage Address. This 24-bit field contains the real storage address mapped to the given virtual address if translation was successful. This field is set to zero if translation failed.

Figure 16:
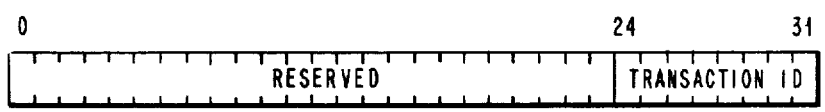
FIG. 16 is a diagrammatic illustration of the format of the Transaction Identifier Register.

The Transaction Identifier Register (TID) contains the eight-bit identifier of the task currently defined as the "owner" of special segments. If a segment is defined as a special segment by the Special Bit in the selected segment register, then lockbit processing as described in Section 6.2 applies to the storage access. Lockbit processing uses the value contained in the TID and compares it against the TID entry in the TLB to determine if the storage access is permiteed. The format of the Transaction Identifier Register is shown in FIG. 16.

The transaction Identifier Register is defined as follows:

Bits 0:23: Reserved.

Bits 24:31: Transaction Identifer. This eight-bit value specifies the owner of special segments.

Figure 17:
FIG. 17 is a diagrammatic illustration of the contents of one of the sixteen Segment Registers.

The sixteen Segment Registers provided contain the Segment Identifier, Special Bit, and Key Bit. The 12-bit Segment Identifier specifies one of 4096 256M-byte virtual storage segments. The Special Bit indicates that this is a special segment and lockbit processing applies. The Key Bit indicates the level of access authority associated with the currently executing task with respect to storage accesses within the given segment. The format of each Segment Register is shown in FIG. 17.

The content of each Segment Register is defined as follows:

Bits 0:17: Reserved.

Bits 18:29: Segment Identifier. This 12-bit quantity specifies one of 4096 256M-byte virtual storage segments.

Bit 30: Special Bit. This bit is set to one for special segments, and set to zero for non-special segments.

Bit 31: Key Bit. This bit determines the level of access authority of the currently executing task for accesses within the given segment. Use of this bit for storage access control is described in Section 6.1.

In the herein disclosed embodiment, each of the two TLBs contain sixteen entries which provide the necessary translation and control information for the conversion of a virtual address to a real address. In addition, each TLB entry contains additional information used for storage access control. Since the TLB contents are automatically updated from the main storage page table by hardware, writing of a TLB entry followed by a read will not necessarily read the same data which was written. Also, altering TLB entries can cause unpredictable results since the correspondence between virtual and real addresses will be destroyed. Access to the TLB contents is provided for diagnostic purposes only, and should only be made in non-translated mode. A write to a TLB entry in non-translated mode with all other translated accesses disabled, followed by a read, will read the same data that was written.

Each TLB entry is logically a 66-bit quantity (excluding reserved bits) composed of a 25-bit address tag, a 13-bit real page number, a valid bit, a 2-bit key, a write bit, an 8-bit transaction ID, and 16 lockbits. Each TLB entry is partitioned into three fields which are individually addressable. The format for each of the TLB fields are described below.

The "TLB Address Tag" field contains the high-order 25 bits of the segment identifier || virtual page index for 2K pages, and the high-order 24 bits for 4K pages. The format of the Address Tag field for each TLB entry is shown in FIG. 18.1.

The content of each TLB Address Tag field is defined as follows:

Bits 0:2: Reserved.

Bits 3:27: Address Tag. This field contains high-order 25 bits of the segment identifier || virtual page index for 2K pages, and the high-order 24 bits for 4K pages. For 4K pages, the Address Tag is contained in bits [3:26].

Bits 28:31: Reserved.

The "TLB Real Page Number, Valid bit (V), and Key bits (key)" field contains the real page number assigned to the virtual address contained in the Address Tag Field of the TLB entry. This field also includes a Valid Bit to indicate the given TLB entry contains valid information, and Key Bits for the access authority required for a given page. The format of this field for each TLB entry is shown in FIG. 18.2.

The content of the Real Page Number, Valid, and Key Bits field is defined as follows:

Bits 0:15: Reserved.

Bits 16:28: Real Page Number. This 13-bit field specifies one of 8192 real pages. If less than 8192 pages are implemented, only those low-order bits required to address the number of implemented pages are used.

Bit 29 Valid Bit. This bit is a one when the selected TLB entry contains valid information. This bit is a zero if the TLB entry contains invalid information.

Bits 30:31: Key Bits. This 2-bit field defines the access authority for each page. Use of the Key bits are described in Section 6.1.

The "TLB Write Bit, Transaction ID, and Lockbits" field contains the Write Bit, Transaction ID, and Lockbits assigned to the virtual address contained in the Address Tag field of the TLB entry, if the TLB entry is for a special segment. The format of this field for each TLB entry is shown in FIG. 18.3.

The content of each TLB Write Bit, Transaction ID, and Lockbit field is defined as follows:

Bits 0:6: Reserved.

Bit 7: Write Bit. This bit defines the access authority associated with each page for special segments. Use of this bit in lockbit processing is described in Section 6.2.

Bits 8:14: Transaction Identifier. This 8-bit field defines the task which currently owns the selected page within a special segment. Use of these bits in lockbit processing are described previously.

Bits 15:31: Lockbits. This 16-bit field defines the access authority for each "line" within a 2K or 4K page for special segments. A line is 128 bytes for 2 K pages, and 256 bytes for 4 K pages. Use of these bits in lockbit processing are described in Section 6.2.

The present translation mechanism provides hardware support for frequently required translation functions. This hardware provides the ability to selectively invalidate TLB entries, and to perform a "load real address" function similar to that provided by the IBM System/370 family of computers.

As changes to the virtual-to-real address mapping are made, it is necessary for system software to synchronize the contents of the TLBs with the contents of the page table in main storage. Entries in both the TLBs and page frame tables must be purged (invalidated) to ensure that obsolete mapping information is not used for a subsequent translation.

The present system provides three functions to assist in the synchronization of TLB entries with the contents of the page table in main storage. These functions can be used to invalidate the entire TLB contents, or to invalidate only selected TLB entries. These functions are involked by I/O write instructions (IOW) directed to specific I/O addresses within the 64K byte block of I/O addresses recognized by the system. Adress assignments for each of these functions will be given to the system as required.

An "Invalidate Entire TLB" function causes all TLB entries to be invalidated. This will force the TLB contents to be updated from page tables in main storage for subsequent translations.

An I/O write to the address associated with this function causes all TLB entries to be invalidated. The data transferred by the I/O write instruction is not used.

An "Invalidate TLB Entries in Specified Segment" function causes all TLB entries with the specified segment identifier to be invalidated. Subsequent translations using this segment identifier will cause the TLB contents to be updated from page tables in main storage.

An I/O write to the address associated with this function causes TLB entries with the specified segment identifier to be invalidated. Bits [0:3] of the data transferred by the I/O write instruction are used to select the segment identifier. All TLB entries containing this segment identifier are invalidated. Subsequent translations with an effective address within the invalidated segment will cause the TLB contents to be updated from the page table in main storage.

The "Invalidate TLB Entry for Specified Effective Address" function causes the TLB entry with the specified effective address to be invalidated.

Subsequent translations with an effective address within the page containing the specified effective address will cause the TLB contents to be updated from the page table in main storage.

An I/O write to the address associated with this function causes the TLB entry with the specified effective address to be invalidated. Bits [0:31] of the data transferred by the I/O write instruction are used as the effective address. The normal translation process is applied using the segment register contents contained in the present address translation mechanism.

The "Compute Real Address" function is used by system software to determine if a given virtual address is currently mapped in real storage, and what real address is assigned to the virtual address if it is mapped.

If a virtual address is not mapped, then its use would cause a page fault; this information may be important to the system routines running with interrupts disabled. The result of the virtual-to-real translation is required by system I/O routines, since most I/O operations are performed using real storage addresses.

The compute Real Address function is invoked by an I/O write to the address associated with this function. Bits [0:31] of the data transferred by the I/O write instruction are used as the effective address. This effective address is then used for the normal translation process, except the results of translation are loaded into the Translated Real Address Register (FIG. 15) (TRAR), rather than being used to access storage. The TRAR contains a bit indicating whether the translation was successful, and the corresponding real storage address if the translation was successful. Normal storage protection processing and lockbit processing are included in the indication of successful translation. Results of the Compute Real Address function are obtained by an I/O read of the TRAR.

A 64K-byte block of I/O addresses are assigned to the translation system. This 64K-byte block begins at an I/O address specified by the I/O Base Address Register. The I/O base address is defined to be on 64K boundaries. The I/O address assignments listed in Table IX are displacements in the specified 64K-byte block. The absolute I/O address is equal to the I/O base address plus the displacement.

TABLE IX

| Displacement | Assignment |
|---|---|
| 0000 thru 000F | Segment Registers 0 through 15. |
| 0010 | I/O Base Address Register |
| 0011 | Storage Exception Register |
| 0012 | Storage Exception Address Register |
| 0013 | Translated Real Address Register |
| 0014 | Transaction ID Register |
| 0015 | Translation Control Register |
| 0016 | RAM Specification Register |
| 0017 | ROS Specification Register |
| 0018 | RAS Mode Diagnostic Register |
| 0019 thru 001F | Reserved |
| 0020 thru 002F | TLB0 Address Tag Field for TLB0 entries 0 through 15. |
| 0030 thru 003F | TLB1 Address Tag Field for TLB0 entires 0 through 15. |
| 0040 thru 004F | TLB0 Real Page Number, Valid Bit, and Key Bits for TLB0 entries 0 through 15. |
| 0050 thru 005F | TLB1 Real Number, Valid Bit, and Key Bits for TLB0 entries 0 through 15. |
| 0060 thru 006F | TLB0 Write Bit, Transaction ID, and Lockbits for TLB0 entries 0 through 15. |
| 0070 thru 007F | TLB1 Write Bit, Transaction ID, and Lockbits for TLB0 entries 0 through 15. |
| 0080 | Invalidate Entire TLB. |
| 0081 | Invalidate TLB Entries in Specified Segment. |
| 0082 | Invalidate TLB Entry for Specific Effective Address. |
| 0083 | Load Real Address. |
| 0084 thru 0FFF | Reserved. |
| 1000 thru 2FFF | Reference and Change bits for pages 0 through 8191. |
| 3000 thru FFFF | Reserved. |

It will be apparent from the above description of the preferred embodiment of the invention, that many changes in the form and details of the system hardware and software may readily be made by those skilled in the art without departing from the spirit and scope of the present invention. These changes could obviously include, but are not limited to changes in the memory size, register sizes and control field designation, address size, page frame table accessing methods and organization, and hash addressing methods to name but a few.

We claim:

1. A data processing system comprising:
a central processing unit for accessing information stored in page frames by providing a virtual memory address from a virtual memory address space, said virtual memory address space including a plurality of page frame addresses,
a first memory for storing information organized as a plurality of page frames and accessible by memory addresses represented by a real memory address space and wherein the virtual memory address space includes a substantially larger number of page frames than the real memory address space;
means connected to the central processing unit and the first memory for converting virtual memory addresses received from the central processing unit into real memory addresses for accessing information from single page frames from said first memory, said converting means including:
means for hashing a selected virtual address to produce a hashed address;
a first table having a list of hashed addresses each with a corresponding predetermined initial virtual address and a pointer to an entry in a second table;
said second table having a list of virtual addresses corresponding to the initial virtual addresses in the first table and further having a location in the second table corresponding directly to a unique page frame in the real memory address space and each virtual address including a corresponding link address, said link address connecting a plurality of noncontiguous virtual addresses that when hashed produce the same hashed address; and
means for receiving an input virtual memory address, hashing said input virtual memory address with said hashing means to produce an input hashed address, selecting a location in said first table in accordance with said input hashed address, searching the corresponding linked addressed locations until the input virtual memory address is located, locating the corresponding input virtual address in the second table and its corresponding real address.

2. A data processing unit according to claim 1 wherein said virtual address converting means further includes means for storing said first and second table in a manner that access to an entry in the first table will provide access to the corresponding entry in the second table.

3. A data processing system according to claim 2 wherein said virtual address converting means further includes means for providing said real address by calculating a table offset value for the entry in the second table.

4. A data processing system according to claim 3 wherein said virtual address converting means includes means for accessing addresses in said second table by calculating the offset based upon the link address of the corresponding predetermined initial virtual address and an address of the table entry.

5. In a data processing system having a central processing unit for accessing information stored in page frames by providing a virtual memory address from a virtual memory address space, said virtual memory address space including a plurality of page frame addresses, a first memory for storing information organized as a plurality of page frames and accessible by memory addresses represented by a real memory address space and wherein the virtual memory address space includes a substantially larger number of page frames than the real memory address space, the first memory also including a first table having a list of hashed addresses each with a corresponding predetermined initial virtual address and a pointer to an entry to a second table and said second table having a list of virtual addresses corresponding to the initial virtual addresses in the first table and further having a location in the second table corresponding directly to a unique page frame in the real memory address space and each virtual address including a corresponding link address, said link address connecting a plurality of noncontiguous virtual addresses that when hashed produce the same hashed address, a method for converting an input virtual address to a corresponding real address, said method comprising the steps of:

hashing the input virtual address to produce an input hashed address;

selecting a location in the first table in accordance with the input hashed address;

searching the linked addressed locations to locate the input virtual address; and locating in the second table the corresponding virtual address and its corresponding real address.

6. A method according to claim 5 wherein said step of locating in the second table the real address includes the step of calculating the real address from the offset position of the corresponding virtual address in the second table.

7. A method according to claim 6 wherein said step of calculating the real address includes the step of calculating the offset based upon the link address of the corresponding predetermined initial virtual address in the first table.

8. A data processing system comprising:

a central processing unit for accessing information stored in page frames by providing a virtual memory address from a virtual memory address space, said virtual memory address space including a plurality of page frame addresses, a first memory for storing information organized as a plurality of page frames and accessible by memory addresses represented by a real memory address space and wherein the virtual memory address space includes a substantially larger number of page frames than the real memory address space;

means connected to the central processing unit and the first memory for converting virtual memory addresses received from the central processing unit into real memory addresses for accessing inforamtion from single page frames from said first memory, said converting means including:

means for hashing a selected virtual address to produce a hashed address;

a first table having a list of hashed addresses each with a corresponding predetermined initial virtual address and a pointer to an entry in a second table;

said second table having a list of virtual addresses corresponding to the initial virtual addresses in the first table and further having a location in the second table corresponding directly to a unique page frame address in the real memory address space and each virtual address including a corresponding link address, said link address connecting a plurality of noncontiguous virtual addresses that when hashed produce the same hashed address and wherein each of said linking addresses is the address of the next connected virtual address in the second table; and means for receiving an input virtual memory address, hashing said input virtual memory address with said hashing means to produce an input hashed address, selecting a location in said first table in accordance with said input hashed address, searching the corresponding linked addressed locations until the input virtual memory address is located, locating the corresponding input virtual address in the second table and its corresponding real address.

9. A data processing unit according to claim 8 wherein said virtual address converting means further includes means for storing said first and second table in a manner that access to an entry in the first table will provide access to the corresponding entry in the second table.

10. A data processing system according to claim 9 wherein said virtual address converting means further includes means for providing said real address by calculating a table offset value for the entry in the second table.

11. A data processing system according to claim 10 wherein said virtual address converting means includes means for accessing addresses in said second table by calculating the offset based upon the link address of the corresponding predetermined initial virtual address and an address of the table entry.

12. In a data processing system having a central processing unit for accessing information stored in page frames by providing a virtual memory address from a virtual memory address space, said virtual memory address space including a plurality of page frame addresses, a first memory for storing information organized as a plurality of page frames and accessible by memory addresses represented by a real memory address space and wherein the virtual memory address space includes a substantially larger number of page frames than the real memory address space, the first memory also including a first table having a list of hashed addresses each with a corresponding predetermined initial virtual address and a pointer to an entry to a second table and said second table having a list of virtual addresses corresponding to the initial virtual addresses in the first table and further having locations in the second table corresponding directly to page frame addresses in the realmemory address space and each virtual address including a corresponding link address, said link address connecting a plurality of noncontiguous virtual addresses than when hashed produce the same hashed address and wherein each of said linking addresses is the address of the next connected virtual address in the second table, a method for converting an input virtual address to a corresponding real address, said method comprising the steps of:

hashing the input virtual address to produce an input hashed address;

selecting a location in the first table in accordance with the input hashed address;

seaching the linked addressed locations to locate the input virtual address; and locating in the second table the corresponding virtual address and its corresponding real address.

13. A method according to claim 12 wherein said step of locating in the second table the real address includes the step of calculating the real address from the offset position of the corresponding virtual address in the second table.

14. A method according to claim 13 wherein said step of calculating the real address includes the step of calculating the offset based upon the link address of the corresponding predetermined initial virtual address in the first table.

* * * * *

UNITED STATES PATENT AND TRADEMARK OFFICE
CERTIFICATE OF CORRECTION

PATENT NO. : 4,680,700

DATED : July 14, 1987

INVENTOR(S) : P. D. Hester et al

It is certified that error appears in the above-identified patent and that said Letters Patent is hereby corrected as shown below:

Col. 27, lines 47-48, delete "inforamtion" and insert --information--.

Col. 28, line 42, delete "realmemory" and insert --real memory--.

Col. 28, line 45, delete "than" and insert --that--.

Signed and Sealed this

Eleventh Day of February, 1992

Attest:

HARRY F. MANBECK, JR.

*Attesting Officer*  *Commissioner of Patents and Trademarks*